United States Patent
Hasebe et al.

(12)

(10) Patent No.: US 6,212,570 B1
(45) Date of Patent: Apr. 3, 2001

(54) INFORMATION DISTRIBUTION DEVICE SELECTION SYSTEM

(75) Inventors: Katsuyuki Hasebe; Shin Miyakawa, both of Palo Alto, CA (US); Hitoaki Sakamoto, Tokyo (JP); Isao Iwasa, Tokyo (JP); Toyonori Fujiura, Tokyo (JP); Takayuki Nakao, Tokyo (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/143,762

(22) Filed: Aug. 31, 1998

Related U.S. Application Data

(60) Provisional application No. 60/083,535, filed on Apr. 29, 1998.

(51) Int. Cl.[7] ................ G06F 15/173; G06F 15/16; H04L 12/28
(52) U.S. Cl. ................ 709/238; 709/227; 370/397; 370/409
(58) Field of Search ................ 709/238, 227, 709/244, 242; 370/397, 409

(56) References Cited

U.S. PATENT DOCUMENTS

| | | | |
|---|---|---|---|
| 5,150,464 | * 9/1992 | Sidhu et al. | 709/222 |
| 5,253,161 | * 10/1993 | Nemirovsky et al. | 709/241 |
| 5,430,729 | * 7/1995 | Rahnema | 370/409 |
| 5,916,306 | * 6/1999 | Ruiz | 709/242 |
| 6,055,574 | * 4/2000 | Smorodinsky et al. | 709/226 |

FOREIGN PATENT DOCUMENTS 817444   1/1998   (EP) .

OTHER PUBLICATIONS

*Computer Networks and ISDN Systems*; vol. 29, No. 8–13, Sep. 1, 1997, pp. 1019–1027 "One–IP: Techniques for Hosting a Service on a Cluster of Machines".

* cited by examiner

Primary Examiner—Krisna Lim
(74) Attorney, Agent, or Firm—Kilpatrick Stockton

(57) ABSTRACT

An information distribution device selection system capable of selecting one information distribution device that is logically closest from the user communication terminal among a plurality of information distribution devices on inter-connected communication networks is disclosed. The system is formed by: a plurality of information distribution service communication networks having an identical communication network identifier, each of which also has an individual communication network identifier for identifying each information distribution service communication network on the inter-connected communication networks; a plurality of communication network exchange devices respectively provided in the information distribution service communication networks, each of which has a routing control function; and a plurality of information distribution devices respectively provided in the information distribution service communication networks and having an identical communication terminal identifier, each of which also has an individual communication terminal identifier for identifying each information distribution device on the inter-connected communication networks.

14 Claims, 11 Drawing Sheets

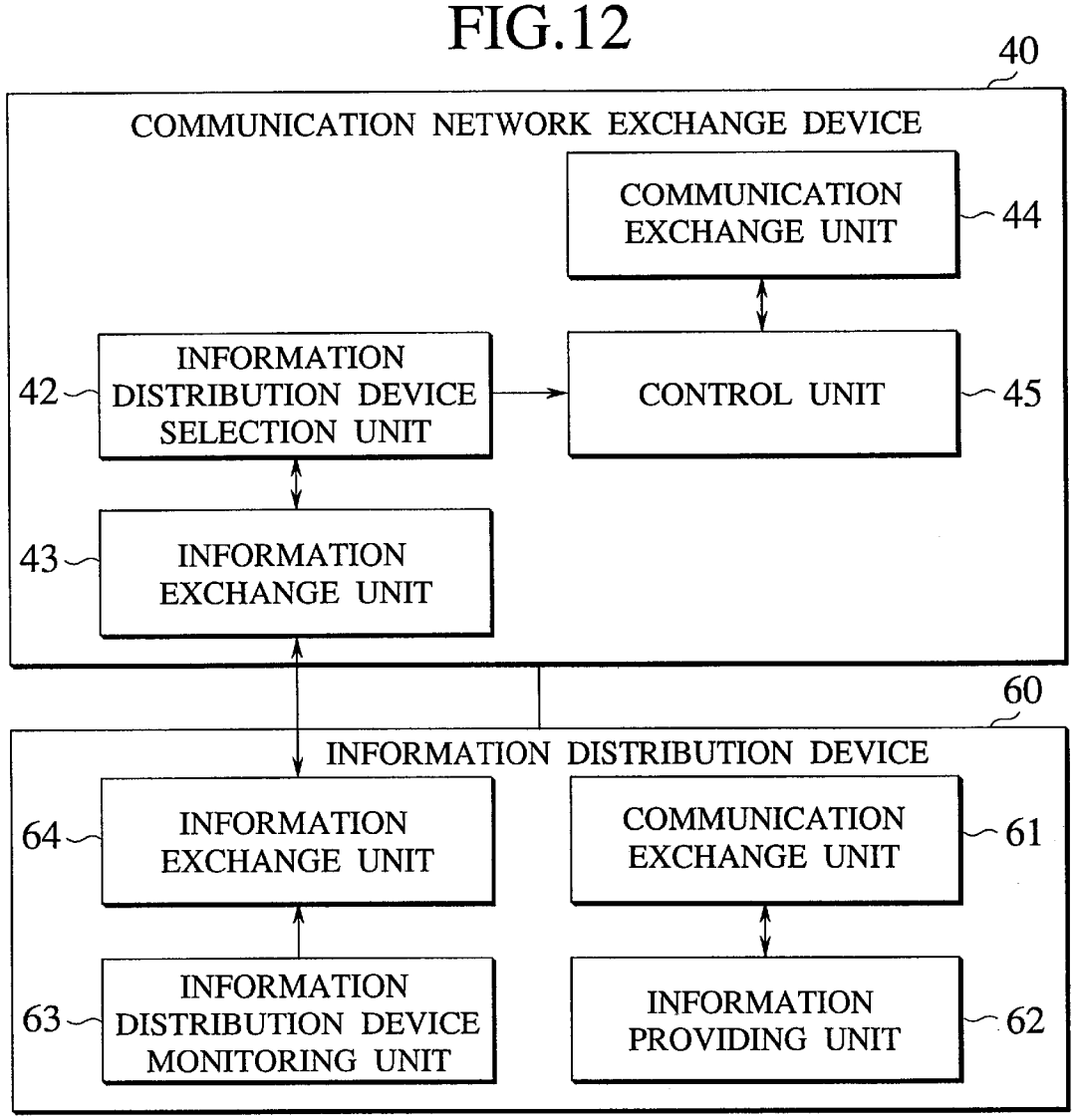

INFORMATION DISTRIBUTION DEVICE SELECTION SYSTEM

This application claim benefit to Provisional application 06/083,535 filing date Apr. 29, 1998.

BACKGROUND OF THE INVENTION

1. Field of the Invention

The present invention relates to an information distribution device selection system for selecting one of information distribution devices available on inter-connected communication networks in response to a request from a user terminal device or an information distribution relay device.

2. Description of the Background Art

The conventional information distribution device selection system has been as shown in FIG. 1. Namely, it is a system in which respectively different communication terminal identifiers (individual communication terminal identifiers) are assigned to a plurality of information distribution devices, and they are presented to a user through a user terminal. For example, in FIG. 1, there are three information distribution devices A to C, so that the individual communication terminal identifiers such as [192.0.10.1], [192.0.10.2], [192.0.20.1] are respectively assigned and displayed at the user terminal. In the case where the user makes a connection by selecting a specific information distribution device, the individual communication terminal identifier of the information distribution device may be inputted, but it is also possible to input a code such as "www.nttlabs.com" as an identifier into the user terminal and convert it into the individual communication terminal identifier at a communication terminal identifier search device and the like.

There is also another conventional information distribution device selection system as shown in FIG. 2. In this system, the individual communication terminal identifiers are also assigned respectively to a plurality of information distribution devices, but besides these, information distribution service identifiers (such as keywords in the case of carrying out information retrieval in Internet or database, for example) for indicating the need for selection are also assigned. Then, whether an identifier entered from the user terminal or the information distribution relay device is an individual communication terminal identifier or an information distribution service identifier is judged, and when it is the information distribution service identifier, a database (which is possessed at a communication terminal identifier search device and the like) for making a correspondence between that information distribution service identifier and the individual communication terminal identifier is searched through and at least one individual communication terminal identifier is specific to the user.

In this system, when a plurality of individual communication terminal identifiers are specified while the order of displayed individual communication terminal identifiers is random at each search, the user selects one individual communication terminal identifier that is displayed first and a communication is carried out according to that individual communication terminal identifier.

More specifically, the operation up to the start of communication at the user terminal device according to this system is as shown in the flow chart of FIG. 3. First, whether the information distribution service identifier is entered form the user terminal device or not is judged (step S1), and if so, the processing for searching the individual communication terminal identifier is carried out (step S2). Then, whether there are a plurality of candidates for the individual communication terminal identifier or not is judged (step S3), and if so, one individual communication terminal identifier is selected at the user terminal device (step S4). After the step S4 or when the step S1 or S3 is NO, the communication to the corresponding individual communication terminal identifier is started at the user terminal device (step S5).

In the conventional information distribution device selection system shown in FIG. 2, when at least two or more information distribution devices are to be connected to the identical communication network, it has been necessary to assign individual communication terminal identifiers respectively, and provide information distribution service identifiers in order to make it possible to search these plurality of individual communication terminal identifiers. Then, it has been necessary to carry out the search through a database using the information distribution service identifier entered by the user, and select the individual communication terminal identifier.

Also, there had been cases where, after the user once successfully made a connection to the information distribution device, the user stores the individual communication terminal identifier which has been specified to the user side from the information distribution device selection system by establishing a correspondence from the information distribution service identifier to the individual communication terminal identifier, for the sake of next access occasion.

However, when the user tries to make a connection to the information distribution device at another occasion by using this stored individual communication terminal identifier, there can be cases where the problem arises. For example, there are cases where the connection to that information distribution device cannot be made for the reason such as malfunction of the communication network. There are also cases where the connection to the original information distribution device cannot be made because the information distribution service provider changed the individual communication terminal identifiers of the information distribution device as the information distribution service provider increases or decreases the number of information distribution devices themselves for the reasons including communication amount and cost. There are also cases where the connection cannot be made because that information distribution device itself is malfunctioning. Consequently, the service provider has been unable to change the system freely and the system has been required to have a high reliability.

In such a scheme that provides the information distribution service identifiers to be handled differently from the individual communication terminal identifiers, the correspondence between the information distribution server identifier and the individual communication terminal identifier of the information distribution device for each communication cannot be complete because there are cases in which the user stores the individual communication terminal identifier at a time of actual communication. Also, even if the relationship between the information distribution device and the information distribution service identifier is to be mapped for each communication, there is a need to establish a procedure for communicating the mapping in advance with respect to each communication application, so that it has been difficult to apply this scheme to the existing communication applications.

The problem associated with the conventional information distribution selection system shown in FIG. 2 is that the respective individual communication terminal identifiers are to be provided in order to identify the information distribution devices at a time of connecting a plurality of information distribution devices to the same communication network, while in the case of connecting a new communication network to the inter-connected communication networks, the communication network identifiers which are unique over the entire inter-connected communication networks are to be assigned because the inter-connection is possible only between the communication networks having different communication network identifiers (the individual communication network identifiers), except for the case of constructing the communication network that does not aim at the inter-connection such as closed area network including intra-company network.

Thus the conventional information distribution device selection system has been basically as shown in FIG. 4, where the user terminal device makes a connection with the only one relevant information distribution device through the inter-connected communication networks.

Then, for an information distribution device to which many connection requests occur, there have been two schemes for handling these many connection requests. The first scheme is to provide a plurality of information distribution devices using different communication terminal identifiers at the physically same location in the same communication network. In this scheme, even though these information distribution devices can handle many connection requests, there is a problem that a bandwidth of a channel through which the communication network containing these information distribution devices is connected to the inter-connected communication networks or a congestion state in a route up to that communication network can be a bottleneck.

The second scheme is to provide a plurality of information distribution devices using different communication network identifiers at the physically different locations in different communication networks, as shown in FIG. 5. In this scheme, although it is possible to avoid a congestion in a route up to a communication network containing an information distribution device by providing a plurality of information distribution devices at different communication networks, it is also necessary to provide a means for enabling the user to explicitly select the communication terminal identifier of the information distribution device, or a means for sequentially selecting the communication terminal identifier of the information distribution device at the communication terminal identifier search device, similarly as in the first scheme, so that it does not necessarily realize an optimum (comfortably utilizable) connection from a viewpoint of the user side.

SUMMARY OF THE INVENTION

It is therefore an object of the present invention to provide an information distribution device selection system capable of preventing problems that arise in the case of utilizing a plurality of identical communication terminal identifiers and selecting one that is logically closest from the user communication terminal among a plurality of information distribution devices, so as to make it possible for the user to extract the information in a comfortable environment without becoming conscious.

According to one aspect of the present invention there is provided an information distribution device selection system for selecting one information distribution device on an inter-connected communication networks formed by a plurality of communication networks, which provides an information in response to a request from a user terminal device or an information distribution relay device, the system comprising: a plurality of information distribution service communication networks which are physically different but having an identical communication network identifier, each information distribution service communication network also having at least one individual communication network identifier for identifying each information distribution service communication network on the inter-connected communication networks which is assigned from a set of individual communication network identifiers to be used in one-to-one communications; a plurality of communication network exchange devices respectively provided in the information distribution service communication networks, each communication network exchange device having a routing control function for inter-connecting a corresponding information distribution service communication network with other information distribution service communication networks; and a plurality of information distribution devices respectively provided in the information distribution service communication networks and having an identical communication terminal identifier, each information distribution device also having at least one individual communication terminal identifier for identifying each information distribution device on the inter-connected communication networks which is assigned from a set of individual communication terminal identifiers to be used in one-to-one communications.

According to another aspect of the present invention there is provided a local unit constituting an information distribution device selection system for selecting one information distribution device on an inter-connected communication networks formed by a plurality of communication networks, which provides an information in response to a request from a user terminal device or an information distribution relay device, the local unit comprising: an information distribution service communication network having an identical communication network identifier as other information distribution service communication networks in the system and at least one individual communication network identifier for identifying the information distribution service communication network on the inter-connected communication networks which is assigned from a set of individual communication network identifiers to be used in one-to-one communications; a communication network exchange devices provided in the information distribution service communication network, having a routing control function for inter-connecting the information distribution service communication network with other information distribution service communication networks in the system; and an information distribution device provided in the information distribution service communication network, having an identical communication terminal identifier as other information distribution devices in the system and at least one individual communication terminal identifier for identifying the information distribution device on the inter-connected communication networks which is assigned from a set of individual communication terminal identifiers to be used in one-to-one communications.

Other features and advantages of the present invention will become apparent from the following description taken in conjunction with the accompanying drawings.

BRIEF DESCRIPTION OF THE DRAWINGS

FIG. 12 is a block diagram showing another exemplary internal configuration of the communication network exchange device and the information distribution device that constitute each local unit in the information distribution device selection system of the present invention.

DETAILED DESCRIPTION OF THE PREFERRED EMBODIMENTS

Referring now to FIG. 7 to FIG. 12, the preferred embodiments of an information distribution device selection system according to the present invention will be described in detail.

First, the outline of the present invention will be briefly described.

Figure 1:
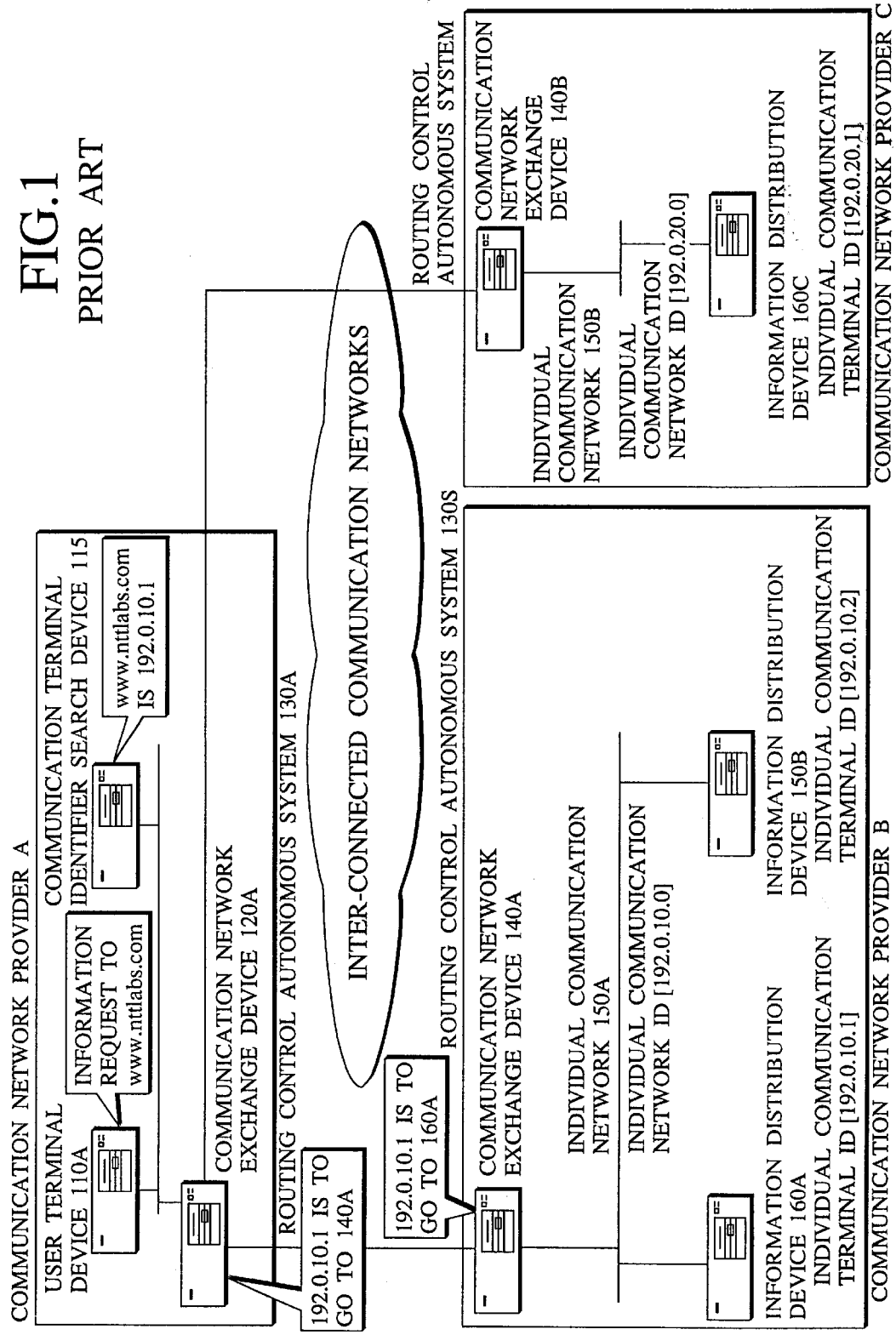
FIG. 1 is a block diagram for explaining one conventional information distribution device selection system.
Figure 2:
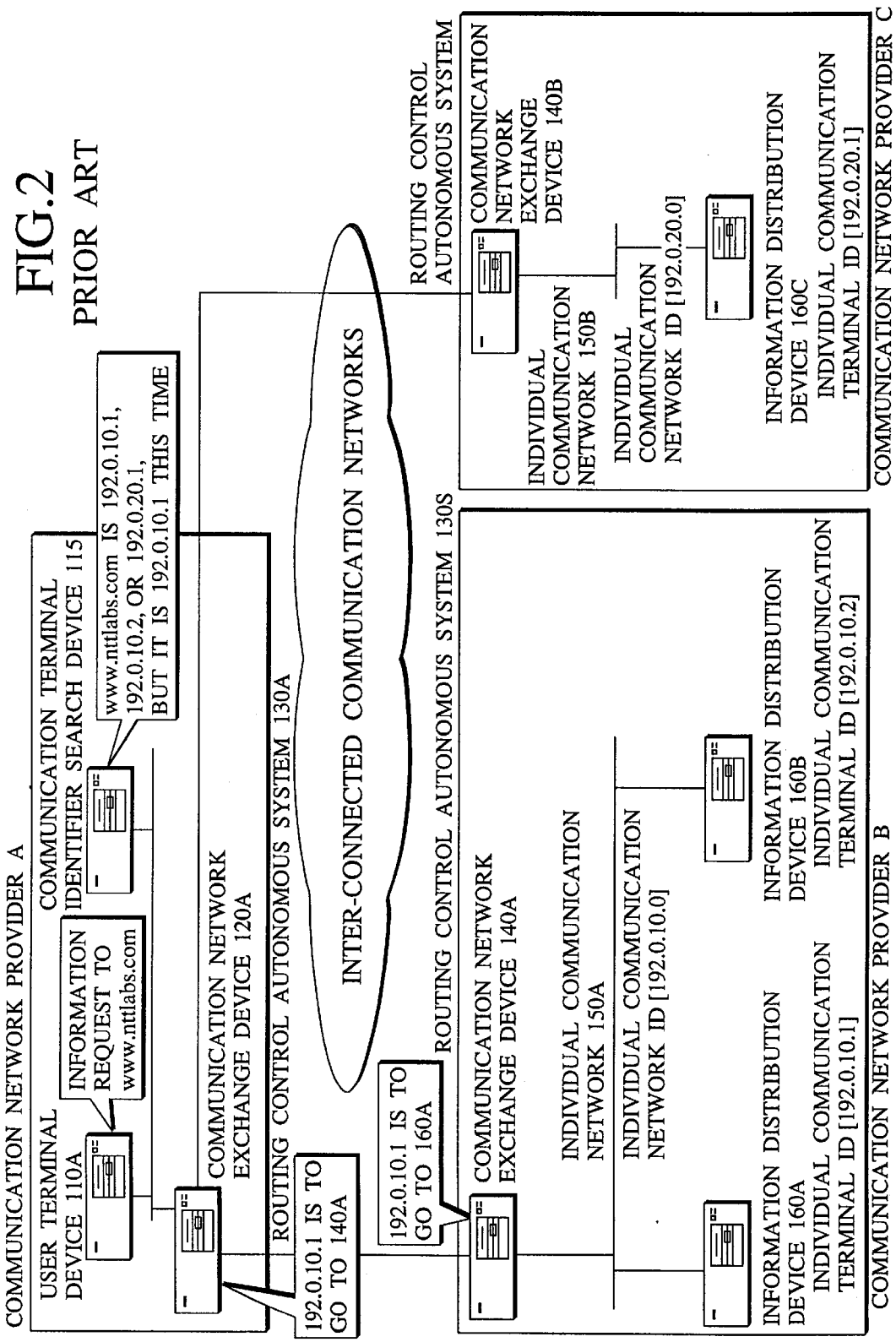
FIG. 2 is a block diagram for explaining another conventional information distribution device selection system.
Figure 3:
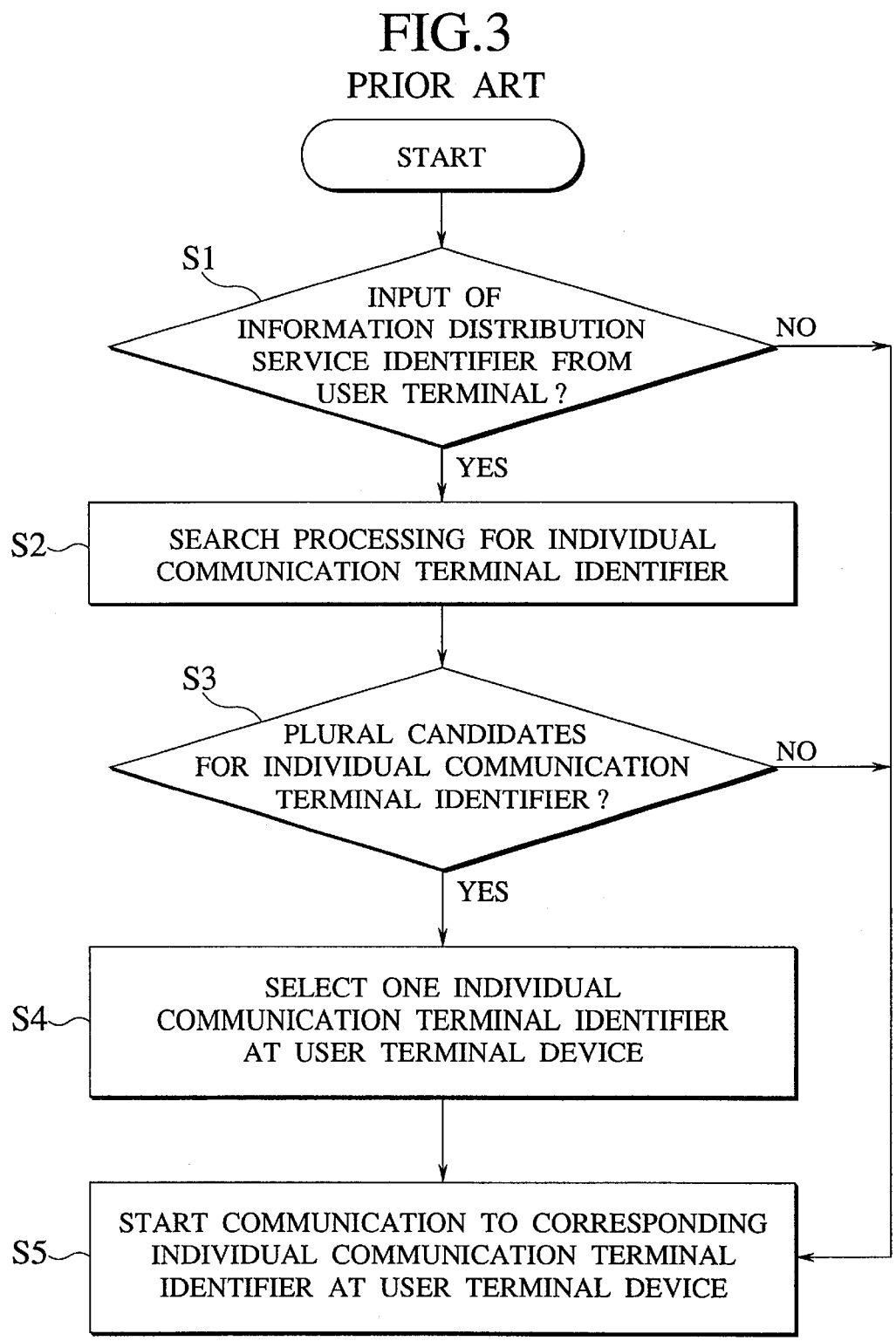
FIG. 3 is a flow chart for the operation at a user terminal device in the conventional information distribution device selection system of FIG. 2.
Figure 4:
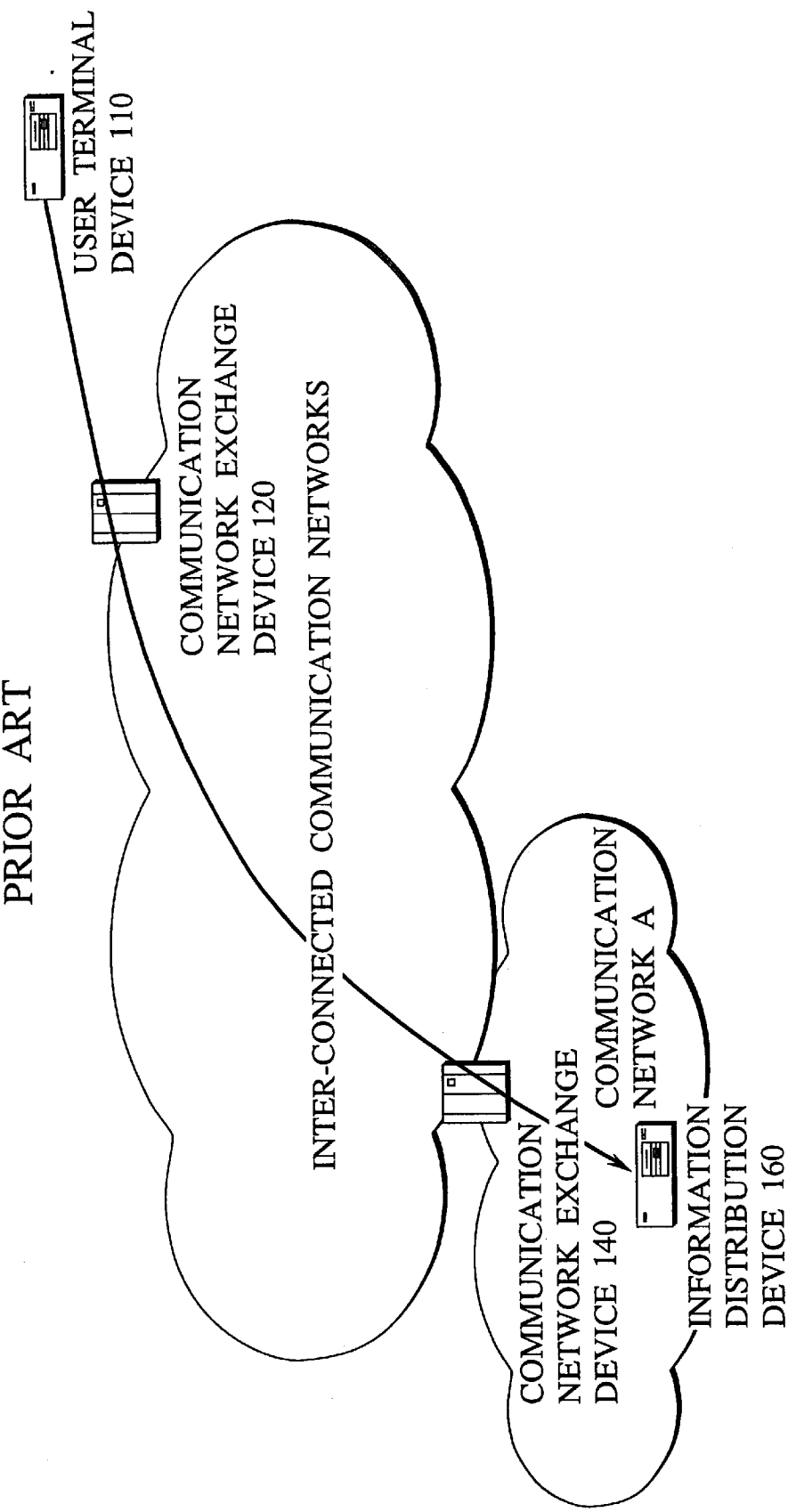
FIG. 4 is a schematic diagram for explaining an operation principle of one conventional information distribution device selection system.
Figure 5:
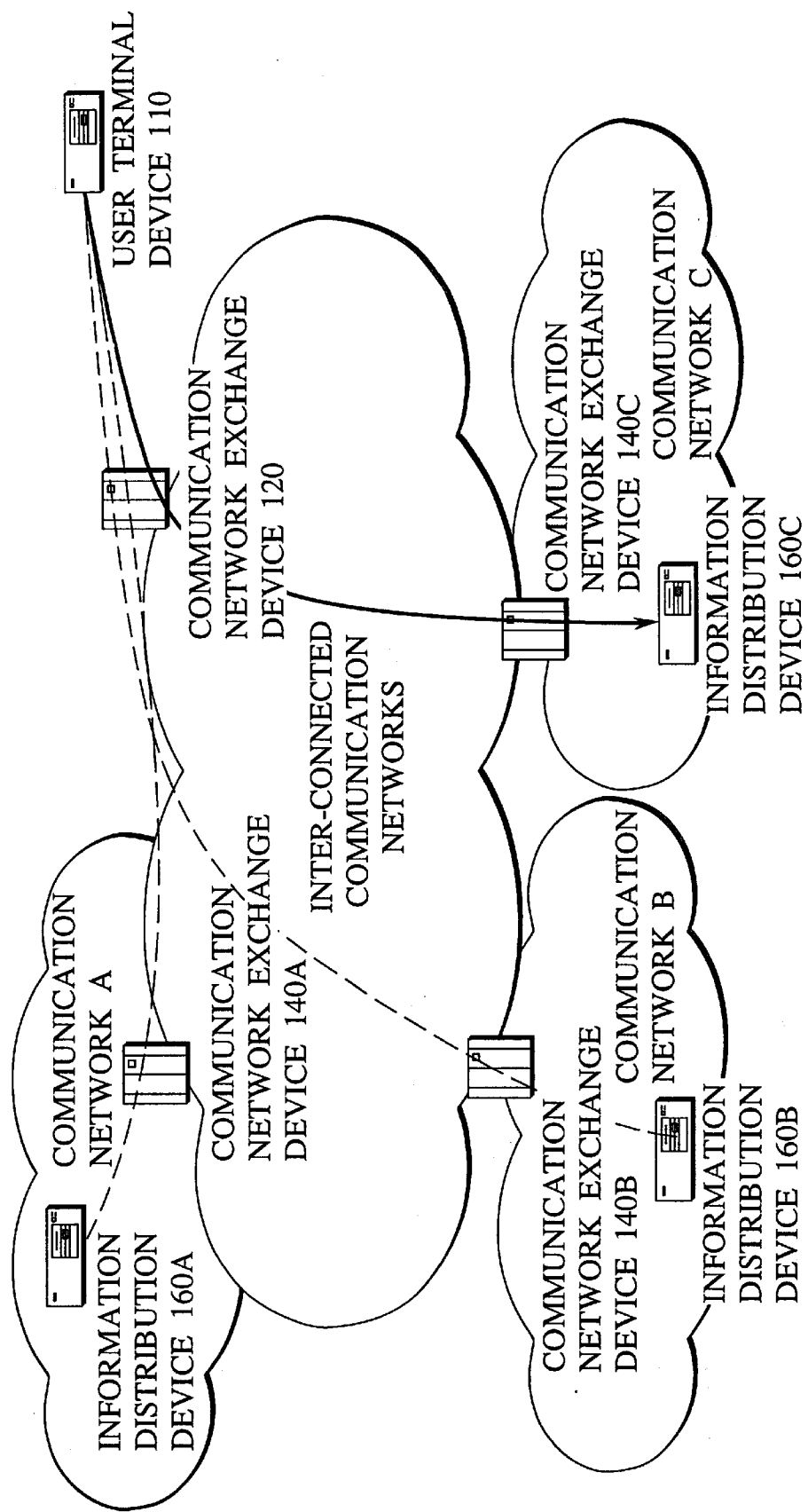
FIG. 5 is a schematic diagram for explaining an operation principle of another conventional information distribution device selection system.
Figure 6:
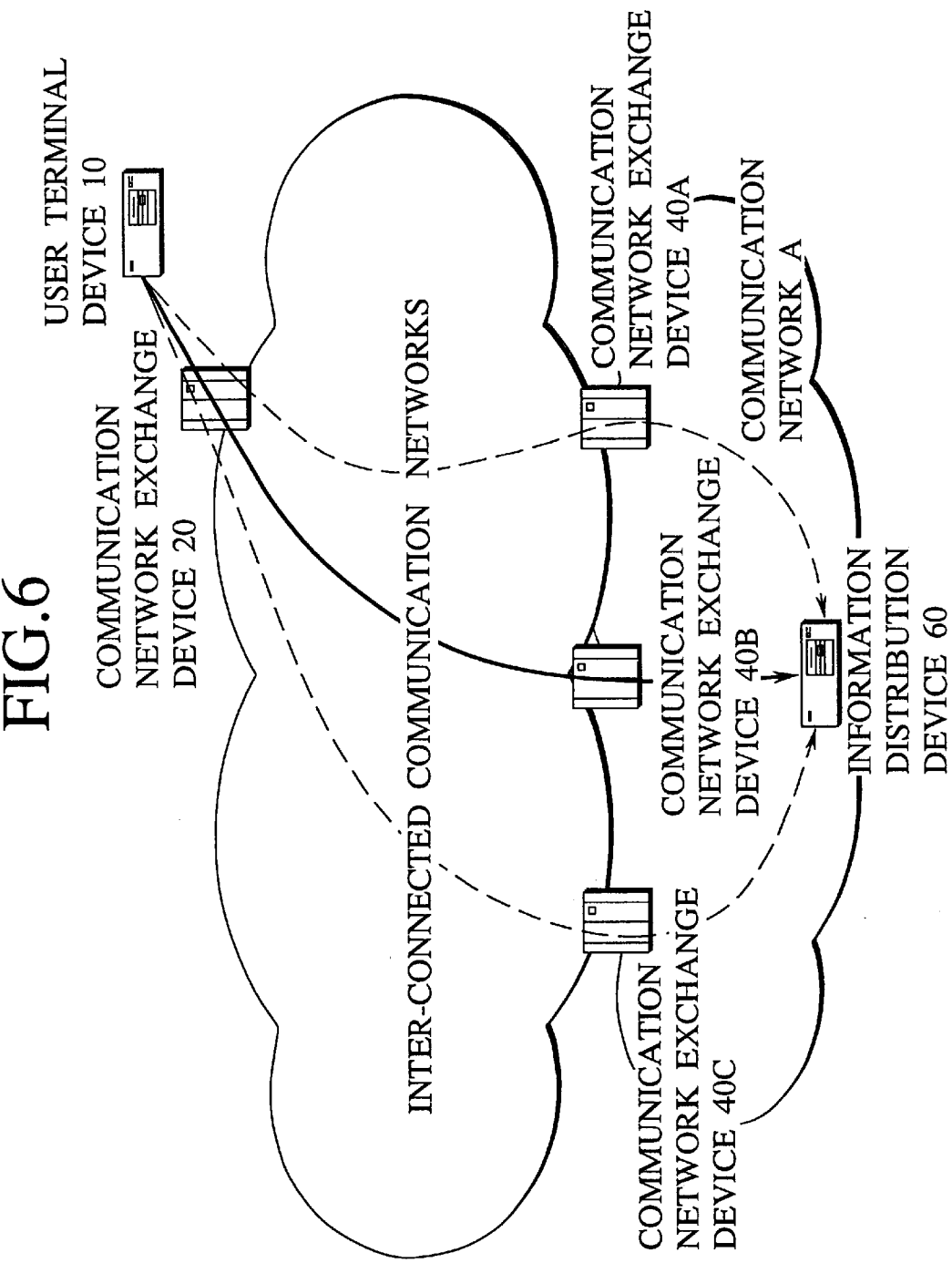
FIG. 6 is a schematic diagram for explaining an operation principle of an information distribution device selection system that partially incorporates features of the present invention.

In order to resolve the problems associated with the conventional information distribution device selection systems, it is possible to consider a system as shown in FIG. 6, where a communication network A has a plurality of connections with the inter-connected communication networks at physically different locations. Then, one or a plurality of information distribution devices 60 are provided in the communication network A, and a method for sequentially selecting a communication terminal identifier of a information distribution device 60 at a communication terminal identifier search device (not shown) is adopted in the case of providing a plurality of information distribution devices 60, such that a request from the user terminal device 10 enters the communication network A from a route that is judged to be optimum, and reaches to the information distribution device 60 using a basic channel within the communication network A. Here, a plurality of information distribution devices 60 may be located at a physically identical location or at physically different locations.

In this system, however, when the communication network A covers a wide area such as that acrossing the pacific ocean, there can be problems such as that a considerable amount of time may be required for communication within the communication network A, and that a route for communicating a response to the user can be asymmetrical with respect to a route for communicating a request from the user.

Figure 7:
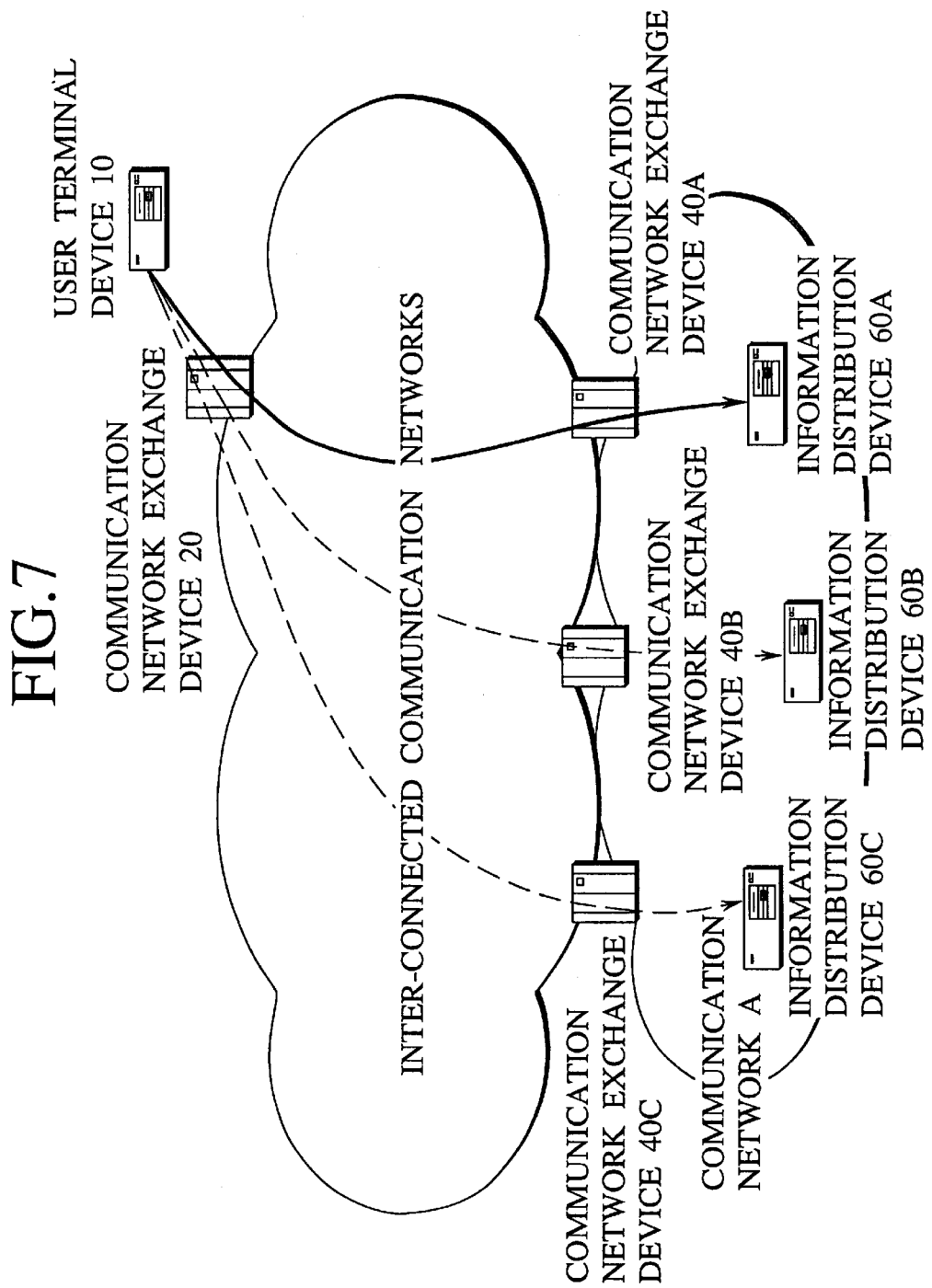
FIG. 7 is a schematic diagram for explaining an operation principle of an information distribution device selection system according to the present invention.

In order to resolve these problems associated with the system of FIG. 6, the present invention proposes a system as shown in FIG. 7, where a communication network A has a plurality of connections with the inter-connected communication networks at physically different locations, and a plurality of information distribution devices 60 having the identical communication terminal identifier are provided at physically different locations in the communication network A. In this system, it is possible for the user to automatically select an optimum route and make a connection to the logically closest information distribution device 60.

More specifically, in this information distribution device selection system of the present invention, when there are at least two or more information distribution devices 60 on inter-connected communication networks, a request is received from a user terminal device 10 or an information distribution relay device (not shown) for making a request to the information distribution device 60 on behalf of the user terminal device 10, and a logically closest one among the information distribution devices 60 is selected without making a user conscious.

Here, it is possible to provide the same information distribution service at a plurality of information distribution devices without assigning a plurality of different communication terminal identifiers (individual communication terminal identifiers), as each one of a plurality of communication networks 50 having a single communication network identifier (identical communication network identifier) that cannot communicate with each other is connected to the inter-connected communication networks, each one of these communication networks 50 sets up another communication network for carrying out communication either statically or dynamically, and the information distribution devices 60 having the identical communication terminal identifier are provided in these communication networks 50 respectively.

Moreover, by making these information distribution devices 60 to have a plurality of different communication terminal identifiers for the purpose of communicating with each other in addition, it becomes possible to select one information distribution device 60 which is logically closest from the user when the identical communication terminal identifier is specified, or to select the individual information distribution device 60 when the individual communication terminal identifier is specified.

In this way, it becomes possible to relay the information in real time from an information input device (not shown) to these plurality of information distribution devices 60, and to carry out the information exchange and the information synchronization among these plurality of information distribution devices 60.

Now, one embodiment of the information distribution device selection system according to the present invention will be described more specifically.

Figure 8:
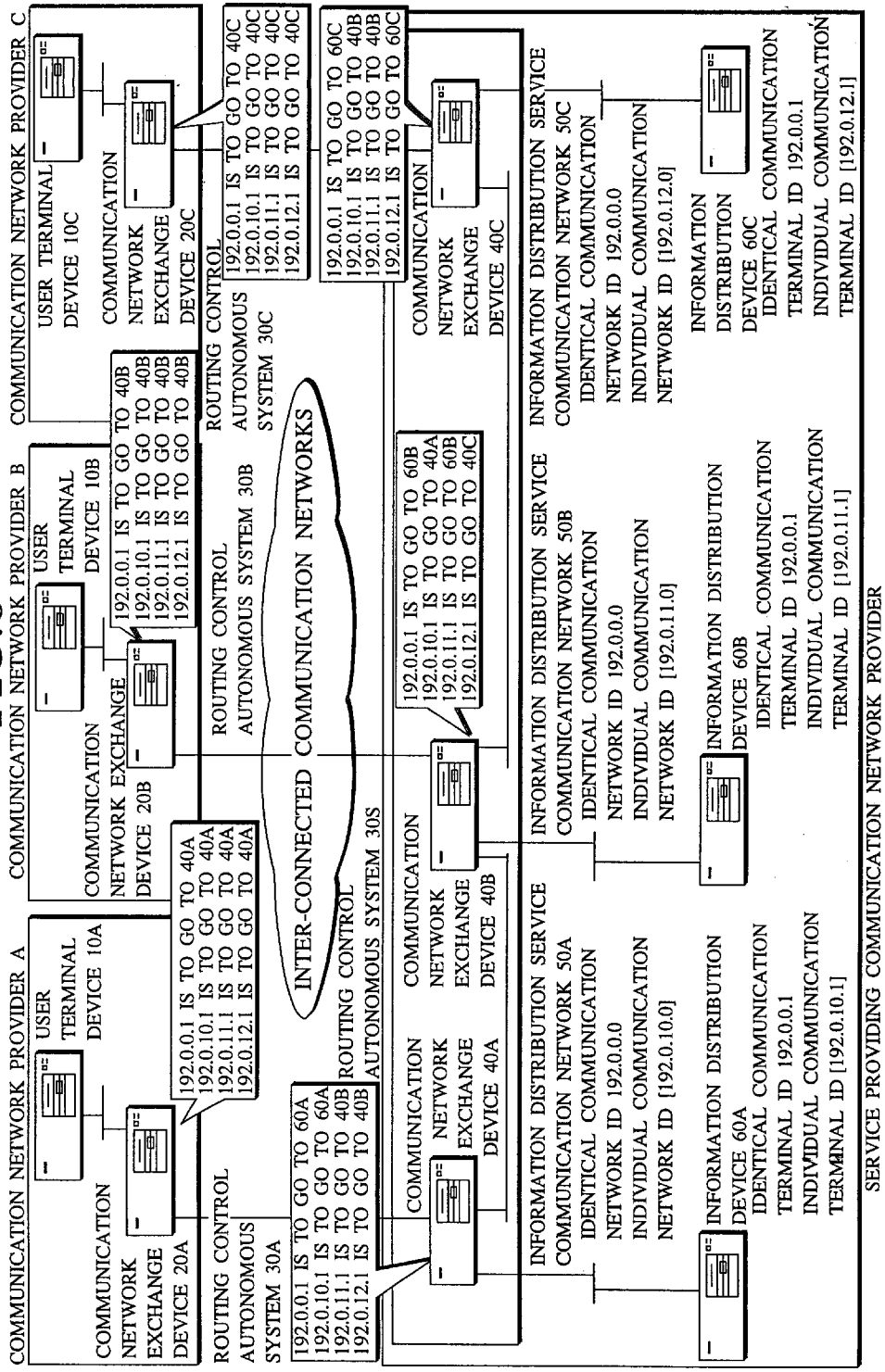
FIG. 8 is a block diagram showing an exemplary configuration of an information distribution device selection system according to one embodiment of the present invention.

FIG. 8 shows an exemplary configuration of an information distribution device selection system in this embodiment, for explaining the principle of the present invention.

This information distribution device selection system of FIG. 8 is a system in which information distribution devices 60A, 60B, and 60C having both the identical communication terminal identifier and the individual communication terminal identifiers are respectively provided within a plurality of information distribution service communication networks 50A, 50B, and 50C, which are physically different but having the identical communication network identifier and the individual communication network identifiers, and connected with each other through communication network exchange devices 40A, 40B, and 40C, that have routing control functions for the sake of making inter-connection with the other communication networks.

In the inter-connected communication networks as a whole, a plurality of communication networks 50 having the identical communication network identifier are going to be present, but from a viewpoint of the user, only one route for the purpose of connection is determined by the routing control function, so that it is possible to select one communication network 50, without making an attempt to simultaneously connect to a plurality of communication networks 50 that are present and without being unable to make a connection.

Since there is only one information distribution device 60 that has a given communication terminal identifier within the communication network 50, the information distribution device 60 corresponding to the user terminal device 10 can be determined uniquely, and it is possible to select one information distribution device 60 from a plurality of information distribution devices 60 without utilizing a plurality of communication terminal identifiers.

More specifically, this information distribution device selection system according to this embodiment is formed as follows. Namely, it is an information distribution device selection system in which at least two or more information distribution devices 60 for realizing the same information providing are present on the inter-connected communication networks formed by a plurality of communication networks, and one information distribution device 60 is selected from a plurality of these information distribution devices 60 that are present, by the user terminal device 10. Here, there are a plurality of information distribution devices 60 but they have the same communication terminal identifier (identical communication identifier). They are respectively provided within a plurality of information distribution service communication networks 50 which are physically different but having the same communication network identifier (identical communication network identifier), and connected through communication network exchange devices 40 having routing control functions for the sake of making inter-connection with the other communication networks.

In the case of connecting a plurality of information distribution devices 60 to a communication network, at least one or more communication terminal identifier would be necessary. However, by providing the information distribution devices 60 respectively in a plurality of communication networks (information distribution service communication networks) 50 having the identical communication network identifier, it is possible to assign the same communication terminal identifier to each of the information distribution devices 60.

The communication network exchange device 40 is essentially an element for controlling a route at a time of transmitting the information, but in this case it is preferable to select the information distribution service communication network 50 to be connected dynamically by receiving routing information from a plurality of information distribution service communication networks 50 having the identical communication network identifier. Then, the routing control function can be realized either only within the routing control autonomous system 30 (which indicates own communication network range at a time of exchanging routing information using external routing control means among communication network providers), or as a combination of a plurality of routing control autonomous system 30. It is preferable to select this according to a size of the information distribution service communication network 50 to be connected to the inter-connected communication networks. Here, it is possible to make an inter-connection with the other communication network providers outside the routing control autonomous system 30 by the existing method without adopting a special method.

This information distribution device selection system of FIG. 8 generally comprises user terminal devices 10, information distribution devices 60, and communication network exchange devices 40. The user communication terminal 10 has a function for issuing a request to the information distribution device 80 so that a user can obtain information from a communication network. The information distribution device 60 has a function for transmitting and providing information upon receiving a request from the user terminal device 10, a function for relaying information such as video, speech, text, etc. in real time, and a function for storing information transmitted from the user. The communication network exchange device 40 is connected between the user terminal device 10 and the information distribution device 60 and has a function for constantly exchanging routing information with the other communication network exchange devices 40 and controlling a route between the user terminal device 10 and the information distribution device 60.

In this system, each communication network exchange device 40 within the service providing communication network provider to which the information distribution device 60 is connected separates the communication network into a basic network and an information distribution service communication network 50 for the sake of the routing control, and makes a set up for a connection to the information distribution device 60 using a routing information table provided in that communication network exchange device 40. This routing information table describes the identical communication terminal identifier (contained in the identical communication network identifier) and a plurality of routing information, from which a route for reaching to the corresponding information distribution device 60 that is the logically shortest route will be selected.

Also, the communication network exchange device 40 within the service providing communication network provider is constantly monitoring the subordinate information distribution device 60 that is directly connected to it, and in the case where that information distribution device 60 stops for reasons including inspection and malfunction, it is possible to automatically select a next candidate and replace the function of that information distribution device 60 with another information distribution device 60, by deleting the corresponding entry of the routing information table within the communication network exchange device 40 and stopping the routing information exchange with the neighboring communication network exchange devices 40 of that communication network. Similarly when the information distribution device 60 is restored, a normal state is resumed as the communication network exchange device 40 that is monitoring the information distribution device 60 at which malfunction occurred checks the restoration and automatically registers it into the routing information table.

By the above mechanism for automatic registration of the routing information table, it is possible to realize the selection of a route to the logically closest information distribution device 60 among a group of the information distribution devices 60 which are currently capable of responding to a request destined to the information distribution service communication terminal identifier.

Figure 9:
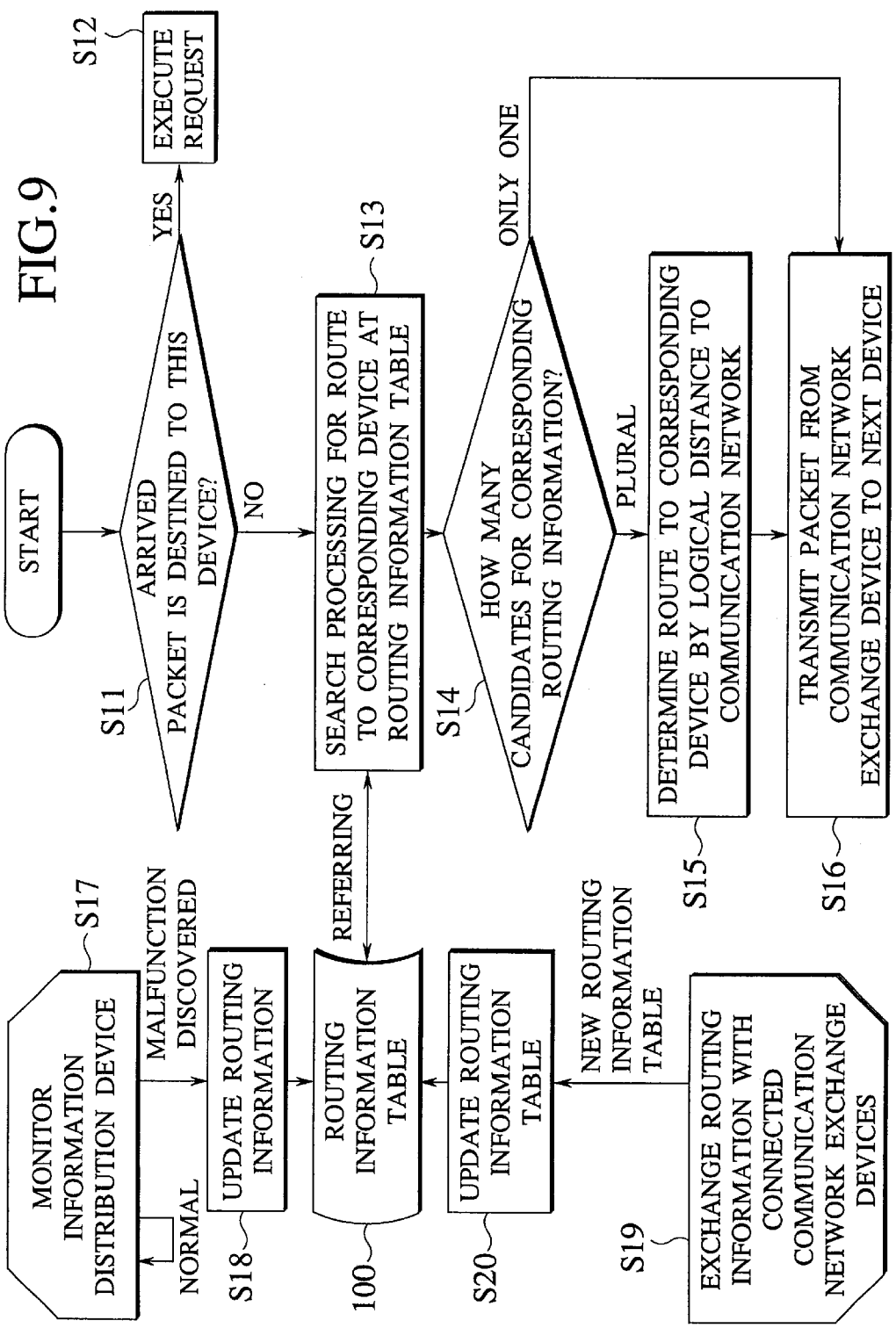
FIG. 9 is a flow chart for the operation of a communication network exchange device in the information distribution device selection system of FIG. 8.

FIG. 9 shows the flow chart for the processing of the communication network exchange device 40 within the service providing communication network provider, which proceeds as follows.

First, whether an arrived packet is destined to this communication network exchange device 40 or not is judged (step S11). If so, the received request is executed (step S12). Otherwise, the packet destined to the other device has arrived, so that a processing for searching a route to the corresponding device is carried out by referring to the routing information table 100 (step S13).

Then, how many candidates for the corresponding routing information are obtained is judged (step S14). If there are plural candidates, a route to the corresponding device is determined according to a logical distance to the corresponding communication network (step S15). If there is only one candidate or after the step S15, the packet is transmitted from this communication network exchange device 40 to the next device (step S16).

On the other hand, the subordinate information distribution device 60 is constantly monitored (step S17), and when a malfunction is discovered, the routing information is updated accordingly (step S18) in the routing information table 100.

In addition, the routing information is exchanged with the connected communication network exchange devices (step S19), and when a new routing information table is received, the routing information is updated accordingly (step S20) in the routing information table 100.

In the following, the coordinated operations of the respective communication network exchange devices 40 will be described again.

In order to offer a plurality of choices by providing the information distribution devices 60A, 60B and 60C within this system, these information distribution devices 60A, 60B and 60C are connected to the information distribution service communication networks 50A, 50B and 50C within the service providing communication network provider. To these communication networks 50A, 50B and 50C, the same communication network identifier (called identical communication network identifier: which is 192.0.0.0 here) and different communication network identifiers (called individual communication network identifier: which are 192.0.10.0, 192.0.11.0 and 192.0.12.0 here) are assigned, and to the information distribution devices 60A, 60B and 60C, the same communication terminal identifier (called identical communication terminal identifier: which is 192.0.0.1 here) and different communication terminal identifiers (called individual communication terminal identifiers: which are 192.0.10.1, 192.0.11.1 and 192.0.12.1 here) are assigned. The communication networks 50A, 50B and 50C are connected to the communication network exchange devices 20A, 20B and 20C respectively via the communication network exchange devices 40A, 40B and 40C and the inter-connected communication networks. The user terminal devices 10A, 10B and 10C are connected to the respective communication networks which are connected to the communication network exchange devices 20A, 20B and 20C.

In the case where the information distribution devices 60A, 60B and 60C are operating normally, the communication network exchange devices 40A, 40B and 40C that correspond to the respective information distribution devices 60A, 60B and 60C transmit the routing information of the corresponding information distribution service communication network and individual communication network to the neighboring communication network exchange devices.

If any one or all of the information distribution devices 60A, 60B and 60C are not operating normally, the communication network exchange devices 40A, 40B and 40C that correspond to the respective information distribution devices 60A, 60B and 60C stop the transmission of the routing information of the corresponding information distribution service communication network and individual communication network that has been transmitted to the neighboring communication network exchange devices.

The communication network exchange devices 40A, 40B and 40C receive the routing information containing a communication network identifier, a communication rate, a transmission delay, the number of communication network exchange devices present on a communication route, and a policy that is transmitted from the neighboring communication network exchange devices, determines a route to the communication network to be connected from these information, and registers it into the routing information table.

The connection request made from the user terminal device 10 to the information distribution device 60 is transmitted to one of the information distribution devices 60 via the communication network exchange device 40A, 40B or 40C to which the user terminal device 10 is connected and via the communication network that is determined by the communication network exchange devices 40A, 40B, or 40C earlier and registered in the routing information table.

The information distribution devices 60 share the information by each producing copies of the information possessed by the other by utilizing the individual communication terminal identifier. At this point, according to the intention of the information provider, it is possible to make it such that copies are not produced at all the information distribution devices 60 or contents are changed for each information distribution device 60.

Similarly, when there is a difference in time, it is possible to carry out such a control that copies are not produced until the time becomes the same. For instance, when the information provider intends to disclose the information at 1:00 A.M. worldwide, the copying of the information can be prohibited until it becomes 1:00 A.M. at a time zone where each information distribution device is located so that the users in that area cannot see the information until it becomes 1:00 A.M. there.

Similarly, it is also possible to change the routing information to be transmitted from a corresponding communication network exchange device according to a prescribed condition so as to realize the prescribed condition intended by the information distribution service provider. For example, when the service provider who are utilizing the information distribution devices that have the identical communication terminal identifier wishes to stop the information providing from one such information distribution device regardless of whether a trouble is occurring at that information distribution device (that is, to intentionally stop the information providing from some specific information distribution device without entirely stopping the information providing utilizing the information distribution devices that have the identical communication terminal identifier), the transmission of the route to the routing information table of the communication network exchange device can be stopped by the procedure similar to that in the case of having a trouble at the information distribution device. In this case, unlike the case of having a trouble at the information distribution device, however, the state of stopping the route transmission will be maintained until a command for resuming the route transmission is issued.

All of the above functions are realized by making a special setting only in the communication network exchange devices 40 within the service providing communication network provider, without changing the setting at the communication network exchange devices within the other communication network providers by the usual inter-communication network routing information transmission that is carried out among the communication network providers.

Figure 10:
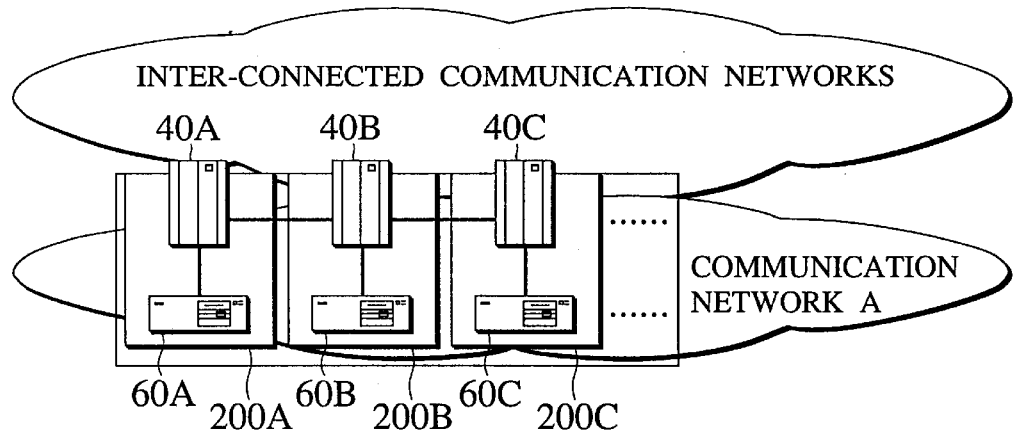
FIG. 10 is a schematic diagram for explaining a construction of the information distribution device selection system of the present invention from a plurality of local units.

Now, as shown in FIG. 10, the information distribution device selection system of this embodiment can be constructed from local units 200A, 200B, 200C and so on which are to be provided at respective locations within the communication network A, where each local unit has a minimum configuration formed by the communication network exchange device 40 and the information distribution device 60.

Figure 11:
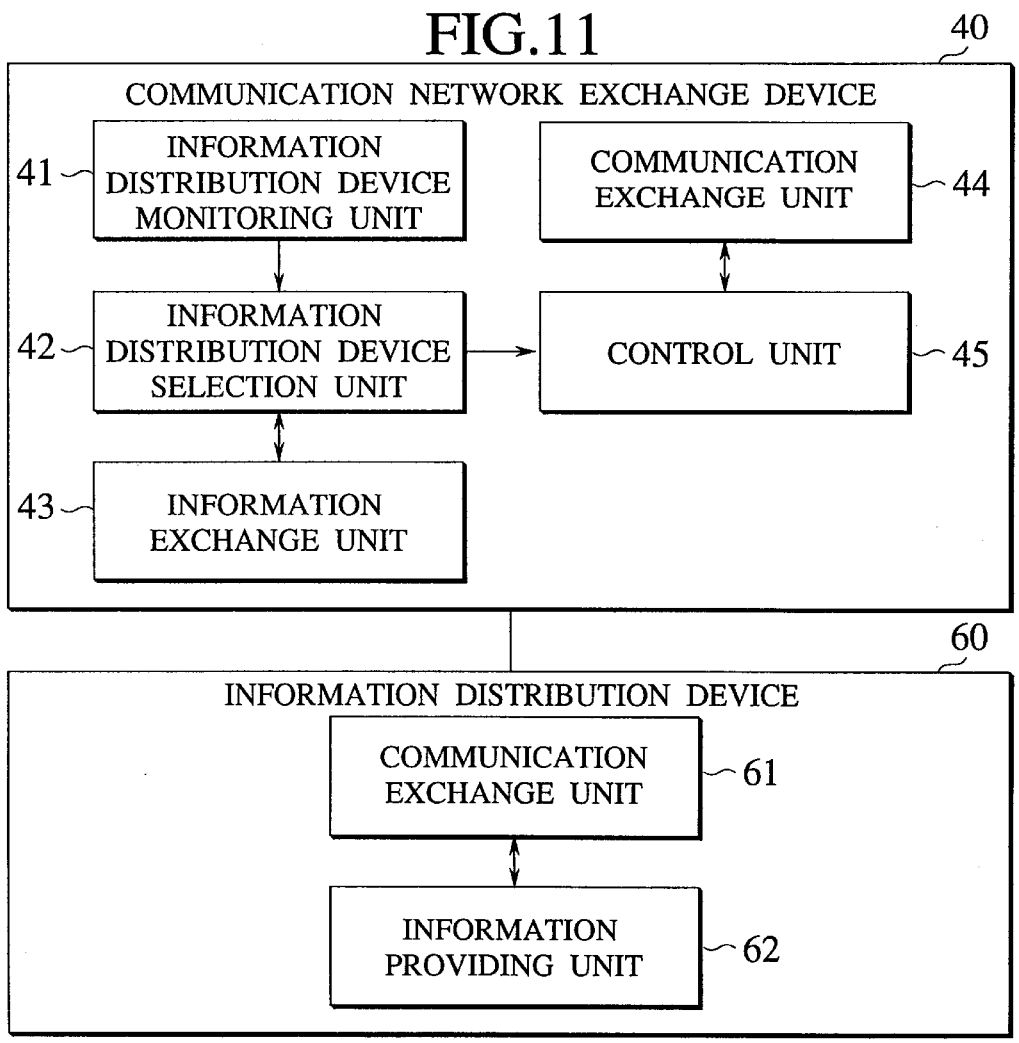
FIG. 11 is a block diagram showing one exemplary internal configuration of the communication network exchange device and the information distribution device that constitute each local unit in the information distribution device selection system of the present invention.

The communication network exchange device 40 and the information distribution device 60 that constitute one local unit can have internal configurations as shown in FIG. 11 or FIG. 12, depending on whether an information distribution device monitoring unit is to be provided within the communication network exchange device 40 as shown in FIG. 11 or within the information distribution device 60 as shown in FIG. 12.

In either case, the information distribution device monitoring unit 41 or 63 is a unit for monitoring whether the information distribution device 60 is operating normally or not, which notifies an information distribution device selection unit 42 in the case where the information distribution device 60 is an abnormal state or in the case the normal state is recovered from the abnormal state.

The information distribution device selection unit 42 is a unit for changing the method for selecting the information distribution device 60 according to a notification from the information distribution device monitoring unit 41 or 63. More specifically, the information distribution device selection unit 42 carriers out the operation to delete a route for the information distribution service communication network 50 having the identical communication network identifier to which the information distribution device 60 is connected, add a route to the information distribution service communication network having the identical communication network identifier which is located at another location notified from the neighboring communication network exchange devices 40 through an information exchange unit 43, and resuming an original state for a route when the information distribution device 60 at the identical location is recovered.

The information exchange unit 43 is a unit for exchanging with the other communication network exchange devices 40 an information on a state of the subordinate information distribution device, an information on routes to the others, and an information for enabling the information distribution using the identical communication terminal identifier.

A control unit 45 is a unit for determining a route for handing the packet received by a communication exchange unit 44 to a next device, according to a judgment made by the information distribution device selection unit 42.

The communication exchange unit 44 is a unit for transmitting and receiving the packet according to a judgment made by the control unit 45 with respect to the neighboring communication network exchange devices 40 and the information distribution devices 60.

A communication exchange unit 61 is a unit for receiving a request for information, and transmitting a response.

An information providing unit 62 is a unit for responding to the request for information that is received through the communication exchange unit 61.

As described, the information distribution device selection system according to the present invention can receive a request from the user terminal device or the information distribution relay device and select logically closest one information distribution device from a plurality of information distribution devices, using one communication terminal identifier.

In the case where that information provider intentionally wishes to change or stop the correspondent communication network to which the information distribution service communication network is connected through the communication network exchange device, it is possible to freely change the conditions for selecting the information distribution device by changing or stopping the content of the routing information according to the conditions including the time and the area to be used as a service area of that correspondent communication network, and as another communication network exchange device that utilizes that routing information sets up a communication route or deletes a communication route.

Even in the case where one information distribution device is stopped without notice to the user for reasons including inspection and malfunction, it is also possible to replace this one information distribution device with another information distribution device by automatically stopping the transmission of the routing information from the communication network exchange device to which that one information distribution device is connected. In the case where the one information distribution device is re-activated after stopping, it is possible to automatically resume the state before the stopping by transmitting the routing information again from the communication network exchange device to which that one information distribution device is connected.

It is to be noted that the above embodiments are described for the case of using a request to the information distribution device from the user terminal device, but it is also possible to use a request from an information distribution relay device for making a request to the information distribution device on behalf of the user terminal device.

It is also to be noted that the above embodiments are described for the case of using only one individual communication network identifier for each information distribution service communication network and only one individual communication terminal identifier for each information distribution device, but it is also possible to use more than one individual communication network identifier for each information distribution service communication network and/or more than one individual communication terminal identifier for each information distribution device (as in the case where the same individual communication terminal identifier is used at a plurality of information distribution devices).

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information distribution device selection system for selecting one information distribution device on an inter-connected communication networks formed by a plurality of communication networks, which provides an information in response to a request from a user terminal device or an information distribution relay device, the system comprising:

a plurality of information distribution service communication networks which are physically different but having an identical communication network identifier, each information distribution service communication network also having at least one individual communication network identifier for identifying each information distribution service communication network on the inter-connected communication networks which is assigned from a set of individual communication network identifiers to be used in one-to-one communications:

a plurality of communication network exchange devices respectively provided in the information distribution service communication networks, each communication network exchange device having a routing control function for inter-connecting a corresponding information distribution service communication network with other information distribution service communication networks; and a plurality of information distribution devices respectively provided in the information distribution service communication networks and having an identical communication terminal identifier, each information distribution device also having at least one individual communication terminal identifier for identifying each information distribution device on the inter-connected communication networks which is assigned from a set of individual communication terminal identifiers to be used in one-to-one communications.

2. The system of claim 1, wherein the system constitutes a routing control autonomous system for one communication network provider, and the information distribution service communication networks are inter-connected with other communication networks by assigning to a plurality of information distribution devices at least one individual communication terminal identifier for identifying each information distribution device on the inter-connected communication networks, from a set of individual communication terminal identifiers to be used in one-to-one communications, without changing a routing information exchange setting made by other neighboring communication network providers.

3. The system of claim 1, wherein when an information distribution service provider of the system intends to limit or stop a connection to one information distribution device from the user terminal device or the information distribution relay device according to a prescribed condition specified for a correspondent communication network to which a service is provided, or to select another information distribution device, said one information distribution device controls a production of copies of information provided by said one information distribution device or changes a routing information to be transmitted from a corresponding communication network exchange device according to the prescribed condition, so as to realize the prescribed condition intended by the information distribution service provider.

4. The system of claim 1, wherein each communication network exchange device has a routing information table and delivers the request received from the user terminal device or the information distribution relay device to a most appropriate information distribution device in the system by referring to the route information table.

5. The system of claim 4, wherein each communication network exchange device includes:

a unit for registering a routing information for the corresponding information distribution device into the routing information table while transmitting the routing information to neighboring communication network exchange devices when the corresponding information distribution device is operating normally, and deleting the routing information from the routing information table while stopping transmission of the routing information to the neighboring communication network exchange devices when the corresponding information distribution device stops operating.

6. The system of claim 5, wherein each communication network exchange device also includes:

a unit for constantly monitoring an operation state of the corresponding information distribution device.

7. The system of claim 5, wherein each information distribution device includes:

a unit for constantly monitoring an operation state of said each information distribution device and notifying the operation state to a corresponding communication network exchange device.

8. The system of claim 5, wherein each communication network exchange device sets another information distribution device to play a role of the corresponding information distribution device by stopping transmission of the routing information to the neighboring communication network exchange division when the corresponding information distribution device stops operating, and recovers a normal state for the corresponding information distribution device by re-registering the routing information into the routing information table while resuming transmission of the routing information to the neighboring communication network exchange devices when the corresponding information distribution device is recovered.

9. A local unit constituting an information distribution device selection system for selecting one information distribution device on an inter-connected communication networks formed by a plurality of communication networks, which provides an information in response to a request from a user terminal device or an information distribution relay device, the local unit comprising:

an information distribution service communication network having an identical communication network identifier as other information distribution service communication networks in the system and at least one individual communication network identifier for identifying the information distribution service communication network on the inter-connected communication networks which is assigned from a set of individual communication network identifiers to be used in one-to-one communications;

a communication network exchange devices provided in the information distribution service communication network, having a routing control function for inter-connecting the information distribution service communication network with other information distribution service communication networks in the system; and an information distribution device provided in the information distribution service communication network, having an identical communication terminal identifier as other information distribution devices in the system and at least one individual communication terminal identifier for identifying the information distribution device on the inter-connected communication networks which is assigned from a set of individual communication terminal identifiers to be used in one-to-one communications.

10. The local unit of claim 9, wherein the communication network exchange device has a routing information table and delivers the request received from the user terminal device or the information distribution relay device to a most appropriate information distribution device in the system by referring to the route information table.

11. The local unit of claim 9, wherein the communication network exchange device includes:

a unit for registering a routing information for the information distribution device into the routing information table while transmitting the routing information to neighboring communication network exchange devices in the system when information distribution device is operating normally, and deleting the routing information from the routing information table while stopping transmission of the routing information to the neighboring communication network exchange devices in the system when the information distribution device stops operating.

12. The local unit of claim 11, wherein the communication network exchange device also includes:

a unit for constantly monitoring an operation state of the information distribution device.

13. The local unit of claim 11, wherein the information distribution device includes:

a unit for constantly monitoring an operation state of the information distribution device and notifying the operation state to the communication network exchange device.

14. The local unit of claim 11, wherein the communication network exchange device sets another information distribution device in the system to play a role of the information distribution device by stopping transmission of the routing information to the neighboring communication network exchange devices in the system when the information distribution device stops operating, and recovers a normal state for the information distribution device by re-registering the routing information into the routing information table while resuming transmission of the routing information to the neighboring communication network exchange devices in the system when the information distribution device is recovered.

* * * * *

UNITED STATES PATENT AND TRADEMARK OFFICE
CERTIFICATE OF CORRECTION

PATENT NO.  : 6,212,570 B1
DATED       : April 3, 2001
INVENTOR(S) : Katsuyuki Hasebe, et al.

It is certified that error appears in the above-identified patent and that said Letters Patent is hereby corrected as shown below:

Title page,
Please change the identification of Assignee, INID Code [73] to read:

-- Nippon Telegraph and Telephone Corporation, Tokyo, Japan, and NTT Multimedia Communications Laboratories, Inc., Wilmington, Delaware 19805 --

Signed and Sealed this

Ninth Day of October, 2001

*Attest:*

NICHOLAS P. GODICI
*Attesting Officer*   *Acting Director of the United States Patent and Trademark Office*